Sept. 27, 1932.  E. MILLER  1,879,391

ADJUSTABLE HORSE COLLAR

Filed June 25, 1931

INVENTOR.
Edward Miller

BY
David E. Carlsen.
ATTORNEY.

Patented Sept. 27, 1932

1,879,391

UNITED STATES PATENT OFFICE

EDWARD MILLER, OF ST. PAUL, MINNESOTA

ADJUSTABLE HORSE-COLLAR

Application filed June 25, 1931. Serial No. 546,809.

My invention relates to improvements in horse-collars and the main object is to provide an adjustable collar, the adjustment means of which are such as to make one size of collar adaptable for use on horses with considerably different sizes of necks. This of course allows for use of a single collar too on a horse that is growing rapidly or has gotten heavier, for example, in the case of a horse that is not used for draft purposes during the winter and therefore grows heavier while idle. A further object is to provide an adjustable horse-collar that is of simple and inexpensive construction, the details thereof involving certain means for securely closing the upper end of it in desired snug fit and eliminating the use of strap buckles.

In the accompanying drawing:—

Figure 1:
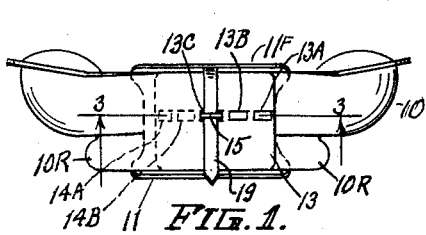
Fig. 1 is a top view of my improved horse-collar, closed at the top end.

Referring to the drawing by reference numerals, 10 designates a horse-collar of the usual type having the right and left shoulder pads 10R and 10L respectively; said collar adapted to be opened and spread at its upper end to slip the collar loosely and upwardly around a horse's neck.

10L is the usual forward rim of the collar forward of the shoulder pads and between which parts the hame (not shown) of the horse-collar is removably retained. 11 is the top neck-pad interiorly of the upper end parts of the collar and from which the entire collar is suspended, when closed. This pad usually comprises an inverted U-shaped part of heavy leather, the front and rear perimetral parts comprising upwardly and outwardly flared flanges 11F and between said flanges forming the arched web 11W (see Fig. 4).

The entire improvement in horse-collars as embodied in my invention is in the said neck-pad 11 and the upper ends of the horse-collars adjustably retained in connection with said pad, as will now be described.

Figure 3:
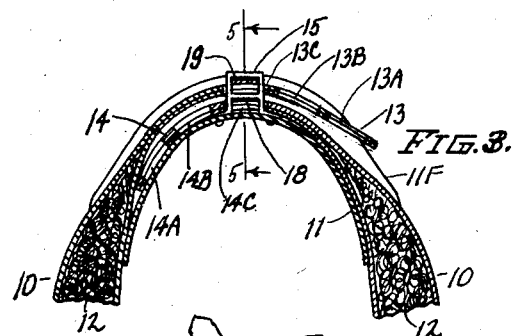
Fig. 3 is an enlarged sectional view of the upper part of a horse-collar embodying my improvements, as on line 3—3 in Fig. 1.
Figure 2:
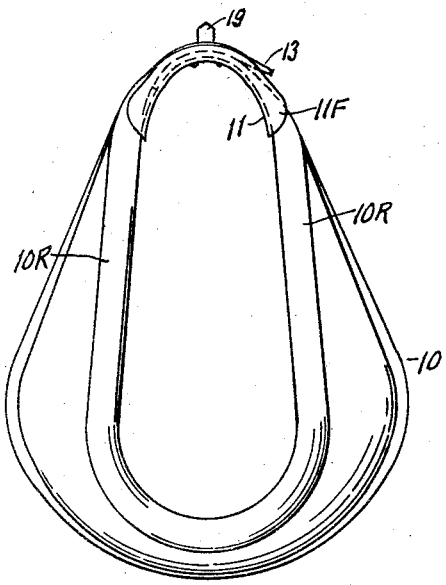
Fig. 2 is a front elevation of Fig. 1.

The major part of my improved horse-collar is to all appearances the same as a standard horse-collar in which the lower half or more and including the shoulder pads and the rims 10R are in a common plane, the collar as a whole tapering upwardly and its top end arranged as stated to be secured on top of the pad 11. The rims 10R and the shoulder pads are stuffed of any suitable material designated 12 in Fig. 3. In my collar its opposite sides are tapered upwardly to the pad engaging part where the tapering terminates and the extremities comprise simply a broad, flat strap end preferably of double thickness leather as shown. One strap is designated 13 and the other 14, and of which 13 is the upper one, both straps normally overlapping each other as shown, until it is desired to open the upper end of the collar. These straps are adapted to lie on top of pad 11 as shown and thus close the top of the collar, the amount of overlap of the straps being governed by the size of the neck of a horse to which the collar is fitted.

The said straps are retained in desired overlapped condition by providing a row of alined slots in each strap extending inwardly from their free ends, the slots in strap 13 being designated in order as 13A, 13B and 13C while the slots in strap 14 are designated 14A, 14B and 14C. These slots are engageable directly and in pairs, with a fixed upright metal double-loop member 15 secured as at 16 on a reenforcing plate 17 extending across and suitably fixed on the top part of pad 11. I have shown a set of three slots in each strap 13—14 though that is not a limitation. For adjustment to the smallest size of the collar straps 13 and 14 are overlapped until their respective slots 13C and 14C register and are simultaneously slipped over the rigid loop member until the latter protrudes above them. Said loop comprises a double loop with two openings provided by merely having an integral center bar 15A. When strap 14 is pressed down over the loop the bar 15A will be slightly above it permitting a narrow strap 18 to be slipped under the bar 15A to hold the strap 14 down.

Figure 4:
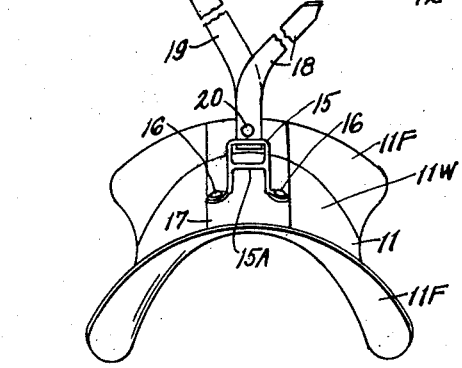
Fig. 4 is a perspective view of the neck-pad part of my improved device, in enlarged scale.
Figure 5:
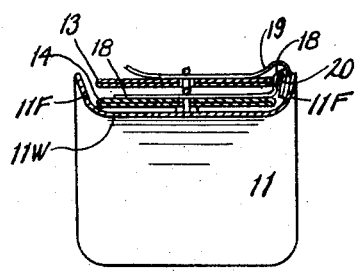
Fig. 5 is a transverse sectional view of the upper closed end of the horse collar, as on line 5—5 of Fig. 3.

19 is another narrow strap or locking member fixed with strap 18 as at 20 to a side flange of the neck pad 11 (see Fig. 4). The latter strap (19) is used to slip under the upper cross bar of member 15 to retain the collar strap 13 under it. Thus the overlapped end straps of the collar are easily retained in desired position, no buckles being required. For adjustment of the collar to larger sizes the slots 13B and 14B may be used or 13A and 14A, the slots being alined in pairs as designated and locked together as described, and if used as stated it is obvious that the pad 11 is always central and the collar hangs properly.

The end straps 13—14 are of course quite flexible and conform readily to the curvature of pad 11.

The weight of the collar alone is sufficient to cause the straps 13—14 to properly bear down on the top or neck pad 11 and the straps 18—19 will securely hold the straps in place.

The use of my device and its simplicity of construction and adaptability for adjustment have been fully disclosed in the preceding description. Variations of structure may be embodied without departing from the scope and spirit of the invention, as for example the number of slots in the overlapping flaps 13—14 may be other than shown but should be a like number and spacing in both. Also, it may be desired to have two rows of slots in each flap and of course two metal loops 15 would then be required.

I claim:

In a draft collar comprising an elongated, suitably padded member adapted to encircle the neck of a draft animal, said collar open at its upper end, a neck pad arranged to contact with the upper part of the neck of the draft animal in transverse position, said open end of the collar comprising a pair of elongated, flat flaps normally overlapped and each comprising the upper end of a side of the collar; means fixed on said neck pad and adapted to engage said overlapped flaps in selectively overlapped positions and securely upon the neck of the draft animal, said latter means comprising a single, fixed metal loop member fixed to project vertically from the top of the neck paid, said flaps being provided in longitudinal alinement inwardly from their ends each with a row of elongated slots, said slots of both flaps arranged to be registered in pairs and slipped downwardly upon said loop member, said loop member having two vertically spaced openings, said flap retaining means comprising a pair of straps fixed to the neck pad, one arranged to be passed transversely through the lower opening of the loop to retain one flap of the collar thereunder and the other strap likewise arranged to be passed through the upper opening of the loop to retain the upper flap of the collar under it.

In testimony whereof I affix my signature.

EDWARD MILLER.